Feb. 5, 1924.  1,482,587
H. L. SMITH
SAFETY RING
Filed May 16, 1923
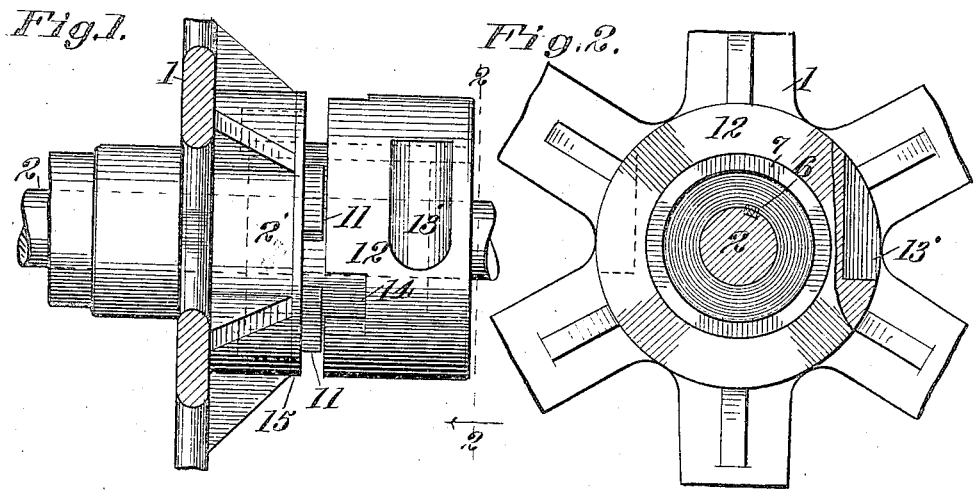
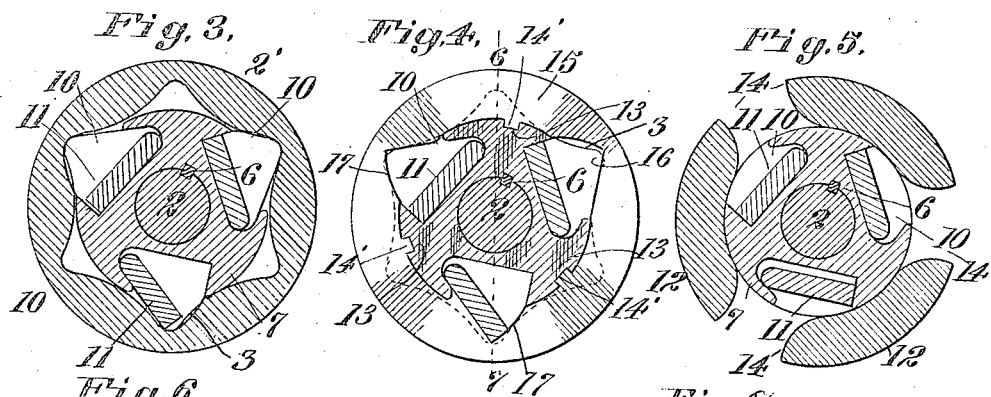
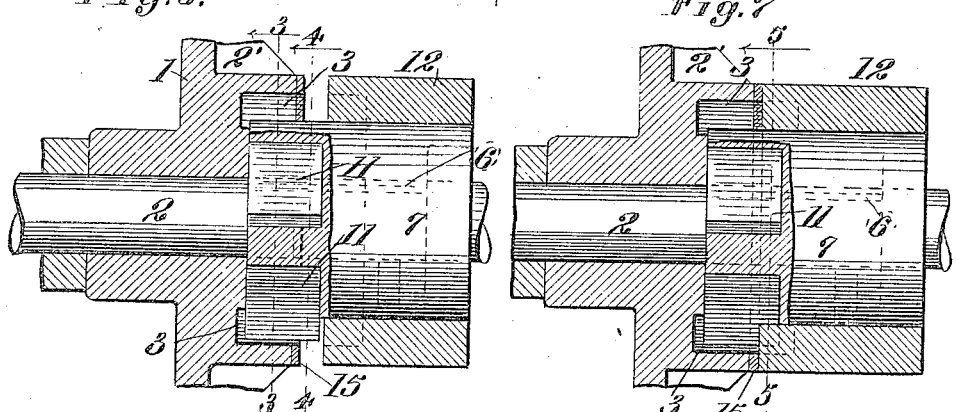
INVENTOR.
H. L. Smith.
BY Acker & Totten
ATTORNEYS.

Patented Feb. 5, 1924.

1,482,587

UNITED STATES PATENT OFFICE.

HENRY L. SMITH, OF DUNEDIN, FLORIDA, ASSIGNOR TO SKINNER MACHINERY COMPANY, OF DUNEDIN, FLORIDA, A CORPORATION OF FLORIDA.

SAFETY RING.

Application filed May 16, 1923. Serial No. 639,468.

*To all whom it may concern:*

Be it known that I, HENRY L. SMITH, a citizen of the United States, residing at Dunedin, in the county of Pinellas and State of Florida, have invented certain new and useful Improvements in Safety Rings, of which the following is a specification.

In the clutch construction illustrated in the pending application of Bronson C. Skinner, Serial No. 504,875, filed October 3rd, 1921, it has been discovered that, on an overrunning of the sprocket relative to the clutch mounting member the clutch dogs at times move longitudinally and jam between the wall of the flange associated with the sprocket and the wall edge of their receiving depressions, causing a breaking of the clutch and requiring expensive replacement in addition to serious loss of time in the operation of the machine.

The present invention relates solely to a device preferably in the form of an interiorly notched plate rotatable with the clutch dog mounting member and provided with portions to overlie the clutch dogs permitting their free swinging movement and at the same time precluding any longitudinal movement on an overrunning of the respective clutch members.

With the above mentioned and other objects in view, the invention consists in the novel construction and combination of parts hereinafter described, illustrated in the accompanying drawings, and set forth in the claims hereto appended, it being understood that various changes in the form, proportion, size and minor details of construction within the scope of the claims may be resorted to without departing from the spirit or sacrificing any of the advantages of the invention.

To more fully comprehend the invention reference is directed to the accompanying drawings, wherein:—

Figure 1 is a view in side elevation of the clutch pawls in engaged relation.

Figure 2 is a sectional view on line 2—2 of Figure 1.

Figure 3 is a sectional view on line 3—3 of Figure 6.

Figure 4 is a sectional view on line 4—4 of Figure 6 illustrating particularly the safety ring.

Figure 5 is a sectional view on line 5—5 of Figure 7 illustrating the pawls in disengaged relation.

Figure 6 is a view on line 6—7 of Figure 4 with the pawls in engaged relation, and Figure 7 is a view on line 6—7 of Figure 4 with the pawls in disengaged relation.

In the embodiment of the invention illustrated, 1 indicates a toothed sprocket constituting the drive member, the same being rotatable on a shaft 2, and from the hub of the sprocket extends an annular flange 2' formed on its inner periphery with surfaces 3 serving as abutments for engagement by the free ends of clutch pawls hereinafter described. Keyed as at 6 to rotate with the shaft 2 and received within the overhanging flange of the toothed sprocket is the other member 7 of the clutch, disposed with one end lying interiorly of the annular flange 2' formed on said toothed sprocket 1. The member 7 is formed peripherally with a plurality of radially disposed pawl receiving depressions 10 in each of which is pivotally mounted a pawl 11, the free ends of which are adapted to project beyond the surface of the member 7 solely by the force of gravity, and to engage the abutting surface 3 on the interior of the annular flange 2' associated with the sprocket 1 to afford a driving connection between the respective clutch members. The pawls are of a width to project beyond the end of the annular flange as illustrated in the drawing. A pawl release sleeve or collar 12 is rotatably mounted on the member 7 and is provided on its periphery with recesses 13' for receiving the ends of an operating fork of the well known type.

The end of the collar 12 adjacent to the flange 2' of the sprocket is longitudinally slotted as at 14 at spaced points corresponding with the spacing of the dogs to insure the alignment of all of said pawls with the slots when it is desired to release the pawls from engagement with the surfaces 3. The interior diameter of the release collar 12 corresponds to the exterior diameter of the clutch member 7 and the movement of the release collar 12 longitudinally of the clutch member 7 toward the pawls causes the pawls to ride the end of the release collar 12 until such time as the slots 14 therein register with the pawls, which will permit further movement of the release collar 12 and cause the pawls 11 to be received within said slots 14. The rotation of the shaft 2 causes a movement of the pawls 11 beneath the slotted portion of the release collar 12, which action disengages the pawls 11 from engagement with the surfaces 3 and releases the clutch members 2 and 7. To permit the engagement of the clutch members it is only necessary to move the release collar 12 outwardly on the member 7 which permits the gravity actuation of the pawls 11 to engage the abutting surfaces 3 on the flange 2' of the sprocket 1. To preclude the longitudinal movement of the pawls 11 within their depressions 10 on the sprocket 1 overrunning the member 7, and at the same time to permit the use of pawls of simple and cheap construction formed without projections or fulcrum pins, thus permitting their reversing when used in clutches having clockwise or contra-clockwise movement, I provide a keeper plate of the hereinafter described construction mounted to rotate with the member 7.

The periphery of the member 7 is longitudinally grooved as at 13, and fitted on the same overlying the pawls 11 and to rotate therewith, with one of the extensions 14' received in each groove 13, is a keeper plate 15 of flat, relatively thin stock. The diameter of the plate is such as to contact with the edge of the flange 2' as in the drawings. Outwardly from its inner periphery the plate 15, at a point overlying each pawl 11, is arcuately cut as at 16 permitting the outward free swinging movement of the respective pawls. The end or radial wall 17 of each cut is curved in the arc of swing of the pawl associated with that particular cut out portion and is slightly spaced from the free end of the pawl as in the drawings. It will be observed that this plate 15 does not in any manner interfere with the operation of the pawls in their swinging movement to engaging or releasing position, or the operation of the pawl release collar, but that it does preclude the longitudinal or lineal movement of the pawls which may be caused by an overrunning of the member 1.

I claim:

1. A clutch consisting of cooperating rotatably mounted drive and driven members, one mounting an annular flange formed interiorly with a plurality of clutch dog receiving faces, the other mounted for rotation within said annular flange and provided with a plurality of clutch dog mounting depressions opening at spaced points about its periphery, a clutch dog pivotally received at one end within each depression for actuation to cause the free ends to engage said dog receiving faces to unite said drive and driven members to rotate in unison, means movable to a position to overlie said dogs for disengaging the same from engagement with said faces, and a notched plate rotatable with the clutch dog mounting member, permitting free swinging movement of said dogs on their fulcrums and precluding their longitudinal movement within their mounting depressions.

2. A clutch consisting of cooperating rotatably mounted drive and driven members, a clutch dog pivotally carried by one member, its free end adapted for swinging movement to engage the other member to cause said clutch members to rotate in unison, means movable over said clutch dog to engage the same to cause its disengagement from the other clutch member to permit the free rotation of one of said members relative to the other and a notched plate overlying the clutch dog and rotatably mounted therewith for precluding longitudinal movement of the clutch dog and permitting its free swinging movement into engaged and released position.

In testimony whereof I have signed my name to this specification.

HENRY L. SMITH.